Oct. 20, 1931.   J. E. PAULSON   1,828,066
POTATO GRADER
Filed May 4, 1929
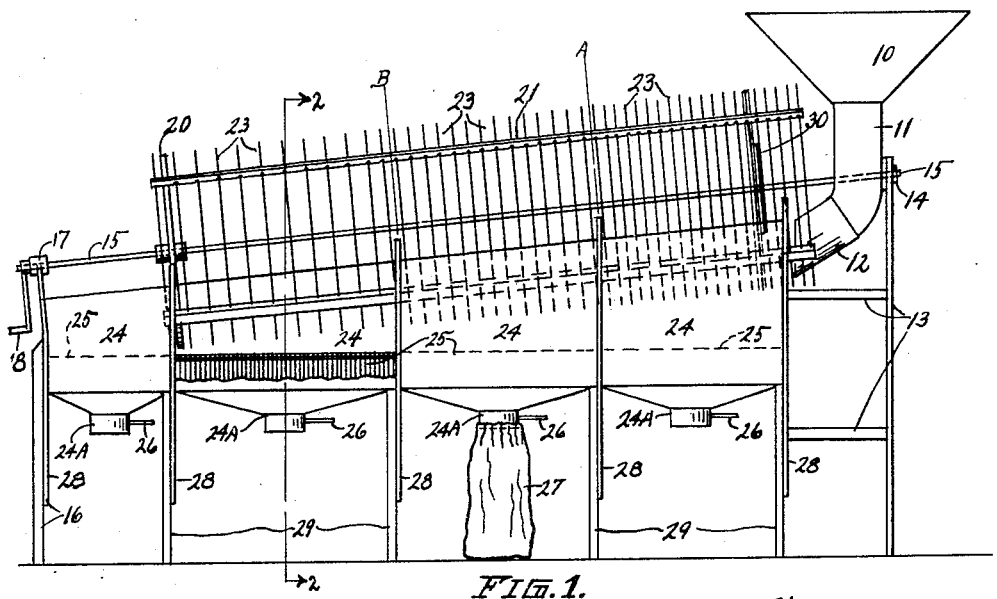
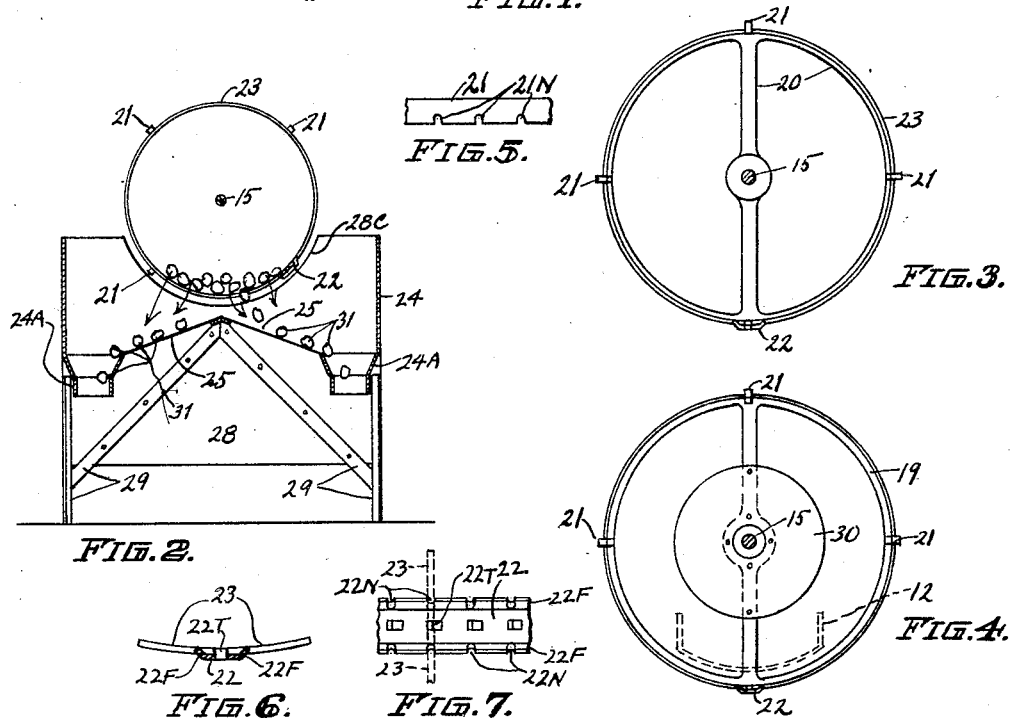
INVENTOR:
John E. Paulson
BY David E. Carlsen
ATTORNEY.

Patented Oct. 20, 1931 1,828,066

UNITED STATES PATENT OFFICE

JOHN E. PAULSON, OF MINNEAPOLIS, MINNESOTA

POTATO GRADER

Application filed May 4, 1929. Serial No. 360,520.

My invention relates to a potato grading or sorting machine and the main object is to provide a simple, efficient and easily operated device which not only separates the potatoes into various grades according to size but also delivers them to hoppers in clear condition free from dirt and other foreign matter. The construction and operation of my device are hereinafter fully set forth, reference being had to the accompanying drawings in which,—

Fig. 1 is a side elevation of my device in operative position, a portion of the side wall of one delivery hopper being broken out to expose certain details.

Fig. 2 is a transverse vertical sectional view of the device about as on line 2—2 in Fig. 1.

Fig. 3 is an end elevation of the lower end of my inclined rotary potato grading cylinder.

Fig. 4 is an end elevation of the upper end of the grading cylinder.

Fig. 5 is a fragmentary side elevation of one of the small elongated ring holding bars of my grading cylinder.

Fig. 6 is a cross section of the main outer, elongated cylinder bar of my device which retains the ring ends of the said cylinder.

Fig. 7 is an elevation of a portion of the main cylinder bar shown in Fig. 6 looking toward same as from the interior of the cylinder.

Referring to the drawings by reference numerals, my device comprises an elevated primary hopper 10 for receiving vegetables such as potatoes; 11 is an outlet pipe from said hopper terminating in a forwardly and downwardly directed trough 12.

The said hopper is mounted on a suitable upright frame 13 in the upper part of which is a bearing 14 bored to receive and retain one end of a cylinder shaft 15 extending forwardly from the hopper and downwardly at a predetermined angle. 16 is an upright frame at the front end of the device with a bearing 17 through which the shaft 15 extends and carries a crank 18 or other means for rotating the shaft, such as a pulley (not shown) where power is available. Fixed concentric about said shaft is an elongated cylindrical potato grader, comprising preferably two ring spiders 19—20 of which 19 is at the upper end and 20 at the lower front end.

These rings are connected by a number of elongated bars 21 spaced apart equi-distant on the rings 19—20 and a main bar 22, all said bars adapted to retain a number of metal rings 23 between them concentric of shaft 15 and comprising the elongated tubular body of the grader. The rings are held spaced apart by the bars 21—22 at predetermined distances, in groups, for example from the highest end of the drum as to line A in Fig. 1, the rings may be spaced 1¼ inches apart, the next group as from lines A to B may be 1¾ inches apart and from line B to lower end of cylinder they may be spaced 2 inches or 2¼ inches apart. The upper end of the cylinder extends preferably in front of the web-ring 19 and the outlet spout 12 terminates just within said upper end rearwardly of the said web for the purpose of discharging potatoes on the rings 23, below shaft 15. It will be readily understood that when potatoes are delivered from spout 12 and the cylinder is rotated the potatoes will roll toward the front and lower end of the cylinder.

Very small potatoes will drop out between the rings to line A. The larger potatoes will continue to roll toward the lower end and in section A—B of the cylinder all potatoes less than 1¾ inches in diameter will drop through excepting of course all the very small potatoes which dropped through the first section as just described. The next larger sizes of potatoes will drop out between line B and the lower end of the cylinder, and the extremely large potatoes will simply be discharged from the end of the cylinder.

Obviously the cylinder may be of various lengths and have more or less groups of spaced rings. Below each group of rings I provide a potato catching hopper 24 in each of which, just below the cylinder, is an elongated inverted ridge of shallow inverted V-shape in cross section and comprising a suitable screen 25 of heavy open mesh or closely spaced bars as shown in Fig. 1. The dropping potatoes roll down the opposite slopes of said ridge member, jarring loose any dirt, roots or other foreign matter clinging to the potatoes, this foreign matter thus dropping to the ground.

The potatoes roll as described to opposite sides of said ridge into outlets 24A of each hopper section, each said outlet preferably provided with a valve 26 (see Fig. 1) and each outlet further arranged to have a potato sack 27 attached for filling the sack from its hopper section. Obviously the potatoes graded as described are readily sacked and stored according to size, and in readiness for market. In usual conditions the extremely small potatoes are not marketable for consumers but disposed of for starch making or feeding to live-stock.

In my device the hoppers 24 are separated by transverse wall members 28 properly spaced and their upper parts cut out to fit close up under the cylinder as at 28C (see Fig. 2) and the side walls of the hopper are parallel to and outwardly of the cylinder to insure that all potatoes are caught. The elongated ridge means 25 permit all foreign matter shaken loose from the potatoes to drop through and on the ground between the outlets of the hoppers 24. The spacing walls 28 are suitably supported as on framework and bracing 29.

The elongated grading cylinder is of course a skeletonized device comprising only the web members 19—20, the rings 23 and bars 21 and 22, but the rear web 20 may have additionally a circular plate 30 fixed concentric of shaft 15 (see Fig. 4) the size of said plate being such as to prevent potatoes from being fed into the cylinder too fast and the plate therefore comprising in combination with the intake 12 an intake feed gauge. The potatoes are designated 31 in Fig. 2. The bars 21 of the cylinder may be plain flat bars of suitable size and each fixed to the cylinder webs 19—20, and their inner edge parts notched as 21N (see Fig. 5) to retain the rings 23.

Each ring comprises as described a loop which is open, the adjacent ends thereof being held spaced apart rigidly by struck-up tongues 22T in the base of bar 22, said bar being preferably a channel member with outwardly sloping flanges 22F which are notched as 22N to retain the rings therein close to their termini (see Figs. 6 and 7). Now it will be readily understood that the rings 23 are readily replaced as their adjacent ends may be readily sprung inwardly and their other parts are readily removed from the notches 21N of the bars 21.

The operation of my grading device has been fully disclosed in the preceding specification. It is obvious that various modifications in construction may be embodied without departing from the scope of the invention.

I claim:

In a vegetable grading device of the class described, an elevated receiving hopper with a downwardly and forwardly directed outlet, an elongated skeletonized rotatable cylinder, and a cylinder shaft therein, said hopper outlet located within the upper end of said cylinder, a main frame supporting said hopper and cylinder and extending longitudinally under the latter, said cylinder comprising a continuous row of rings, the rings at the highest end of the cylinder being spaced apart a predetermined distance in one group and the succeeding lower groups of rings being spaced apart successively in wider spacing, said rings removably mounted concentric of the cylinder shaft, said cylinder comprising a number of circular, skeletonized webs, elongated ring holding bars fixed to said webs, all said bars provided with inwardly opening circularly registering notches to engage the respective rings, and one of said ring holding bars comprising a channel member opening inwardly, the flanges of said channel bar notched to retain each a ring therein near its open part, an integral inwardly extending projection in the web of said channel in alinement between two opposite notches of the said flange to engage in the opening of each loop and to space the adjacent ends thereof.

In testimony whereof I affix my signature.

JOHN E. PAULSON.